United States Patent
Kawashima

(10) Patent No.: US 7,423,682 B2
(45) Date of Patent: Sep. 9, 2008

(54) DIGITAL CAMERA

(75) Inventor: Iwao Kawashima, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 647 days.

(21) Appl. No.: 10/778,361

(22) Filed: Feb. 17, 2004

(65) Prior Publication Data

US 2004/0189825 A1 Sep. 30, 2004

(30) Foreign Application Priority Data

Mar. 25, 2003 (JP) ............................. 2003-082083

(51) Int. Cl.
*H04N 5/222* (2006.01)

(52) U.S. Cl. ............................. 348/333.01; 348/333.02; 348/333.05

(58) Field of Classification Search ............ 348/333.01, 348/333.02, 333.05, 207.2; 396/284, 296
See application file for complete search history.

(56) References Cited

U.S. PATENT DOCUMENTS

| 5,515,104 | A | * | 5/1996 | Okada | 348/333.01 |
| 2003/0184650 | A1 | * | 10/2003 | Brown et al. | 348/207.1 |
| 2004/0095480 | A1 | * | 5/2004 | Battles et al. | 348/231.9 |

FOREIGN PATENT DOCUMENTS

JP          10-191237          7/1998

* cited by examiner

*Primary Examiner*—Yogesh Aggarwal
(74) *Attorney, Agent, or Firm*—McGinn IP Law Group, PLLC

(57) ABSTRACT

In a digital still camera, an image quality selection screen is displayed on a LCD panel by depressing a function button. A color reproducing condition, ISO sensitivity of a CCD image sensor, and the number of recording pixels are selected from among various image quality adjustment items. Plural sub-screens, in which each image quality adjustment item is displayed, are selectively displayed in the image quality selection screen. The selected contents are confirmed and set when the function button is depressed again after selecting the predetermined image quality adjustment items.

3 Claims, 5 Drawing Sheets

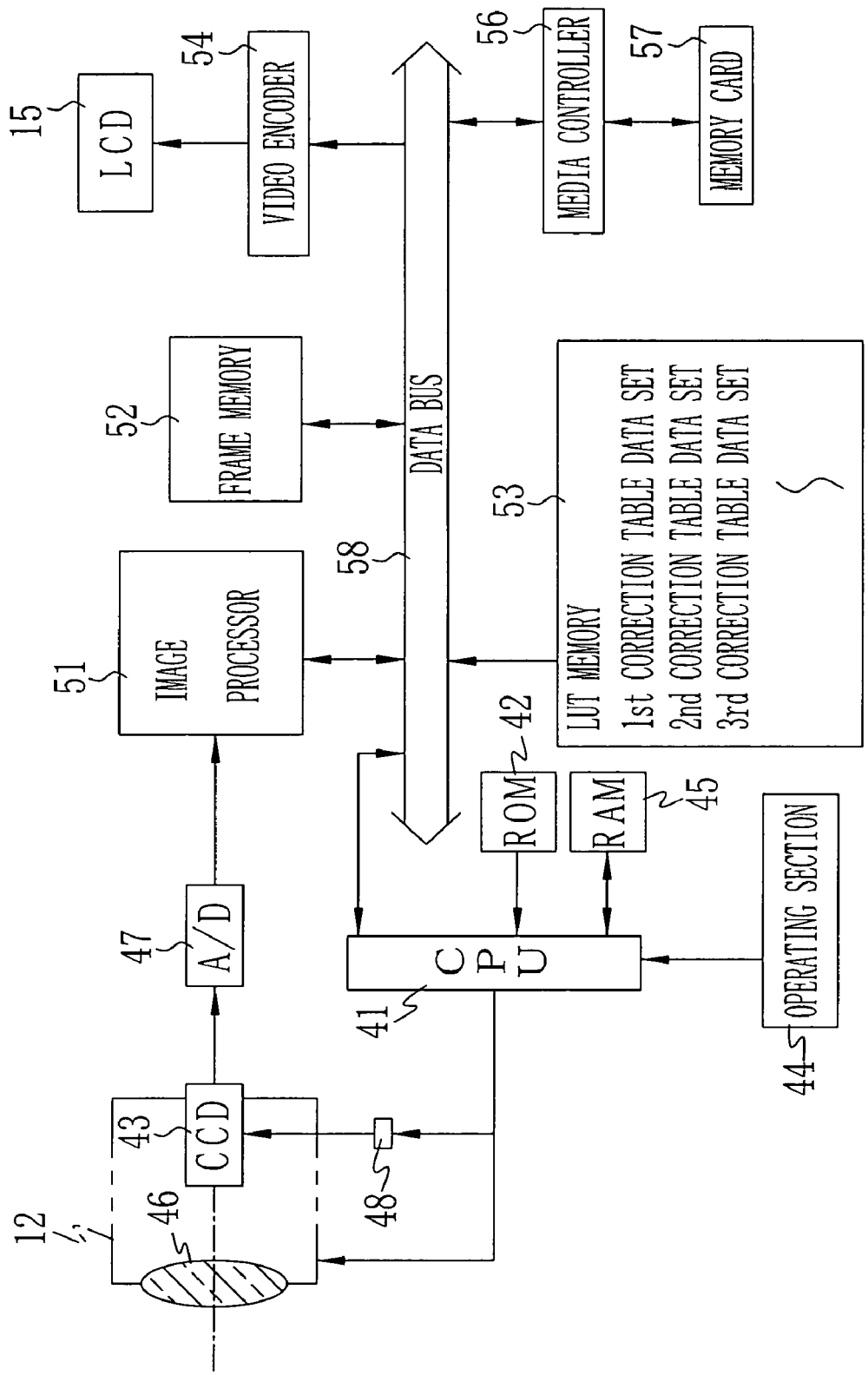

FIG.5

| FILM NAME | FEATURES |
|---|---|
| SUPERIA 100 | NORMAL PERFORMANCE; NATURAL AND VIVID COLOR FINE TEXTURE; ABUNDANT GRADATION |
| SUPERIA 200 | VIVID AND FAITHFUL COLOR REPRODUCTION; ALL-AROUND FOR VARIOUS CASES, SUCH AS LANDSCAPE AND SNAP SHOT |
| SUPERIA 400 | FAITHFUL COLOR REPRODUCTION INCLUDING VIVID FLESH COLOR, VIOLET AND GREEN |
| SUPERIA 800 | VIVID COLOR REPRODUCTION UPON TELEPHOTOGRAPHING OF BIRDS, ANIMALS, AND SPORTS SCENES |
| SUPERIA 1600 | ULTRAHIGH-RESOLUTION AND HIGH-QUALITY; HIGH SHARPNESS WITHOUT LOSING OF VIVIDNESS IN LOW-LIGHT ENVIRONMENTS WHERE FLASH LIGHT CANNOT BE USED, SUCH AS INDOOR HOME SCENES, SUNSET AND NIGHT SCENES, AND STAGE PERFORMANCES |
| REALA ACE 100 | EXTRAORDINARY COLOR ACCURACY; SMOOTH AND EXTRA-FINE GRAIN; HIGH-QUALITY IN REPRODUCTION OF BEAUTIFUL AND NATURAL SKIN TONES; DEPICT TEXTURE FOR IMAGES INCLUDING PORTRAITS AND NATURAL THINGS, SUCH AS FLOWERS HAVING DELICATE COLORS |
| PRO 100 | ABUNDANT GRADATION INCLUDING HIGHLIGHT AND SHADOW; FAITHFUL COLOR REPRODUCTION IN WHITE, BLACK, AND GRAY COLORS; IDEAL FOR SNAP SHOT AND PORTRAITS |
| MONOCHROME | BLACK AND WHITE FILM |
| SEPIA | SEPIA COLOR |

DIGITAL CAMERA

BACKGROUND OF THE INVENTION

1. Field of the Invention

The present invention relates to a digital camera, and more particularly to a digital camera having a function button for displaying and setting of image quality adjustment items by only one action.

2. Description of the Prior Arts

There has been known a digital still camera which has an imaging device for obtaining an image signal after converting a subject photoelectrically, such as a CCD image sensor, and which records an image in a memory card after image processing has been applied to the image signal. Such a digital camera is disclosed in Japanese Patent Laid-Open Publication No. 10-191237, and so forth. The digital camera is provided with various functions for image quality adjustment for changing the image quality of a photographed image differently from a photographic film camera in which an optical image is recorded on the photo film. For example, it is possible to make exposure adjustment by changing a diaphragm value in the digital camera as well as in the photographic film camera; furthermore, color balance or hue of the image, sharpness, a white balance, and so forth can be adjusted in the digital camera differently from the photographic film camera. Moreover, in the digital camera, it is possible to change light-receiving sensitivity (ISO sensitivity) of the CCD image sensor and the number of recording pixels within the number of effective pixels of the CCD image sensor.

The above-mentioned image quality adjustment is performed in a setting menu displayed on a LCD panel. The above-mentioned image quality adjustment items are arranged in the setting menu. A user selects one adjustment item at a time among from the image quality adjustment items, so that a default value can be changed into any values.

The above-mentioned adjustment items except for the exposure adjustment cannot be set in the photographic film camera. The colorhue, the sharpness, and the ISO sensitivity certainly can be slightly adjusted by changing a type of photo film. Even if each photo film has the same ISO sensitivity, the color hue and the sharpness are slightly different according to the type of photo film (see FIG. 5). In case of the photographic film camera, the types of photo film are selected in response to each photographed scene. Also, the finish of the image can be changed by using the different type of photo film even when the same photographed scene is taken. Since the user who lacks expert knowledge of the camera and photographing can select the type of photo film relatively easily, it is possible to easily enjoy the difference of the finish of the image in the photographic film camera.

As aforementioned, the finish of the image can be changed by adjustment of the color hue and the ISO sensitivity even in the digital camera. In addition, it is possible to adjust these adjustment items finely in the digital camera compared to the photographic film camera, so that the user can change the finish of the image widely.

However, a prior art digital camera can adjust each adjustment item finely, but then the expert knowledge for making full use of the digital camera is required. To make matters worse, all the image quality adjustment items are displayed in the single setting menu in an enumerative manner, so that such a digital camera is difficult to use for the user without the expert knowledge.

SUMMARY OF THE INVENTION

A primary object of the present invention is to provide a digital camera in which image quality is adjusted easily.

Another object of the present invention is to provide a digital camera in which a user who is used to using a photographic film camera can adjust the image quality easily.

In order to achieve the above and other objects, an image quality selection pattern for specifying plural ISO sensitivity levels and plural color reproducing conditions is stored in a memory. When a function inputting device is operated, the image quality selection pattern is read out from the memory, and then displayed on a monitor. One ISO sensitivity level and one color reproducing condition are respectively selected after observing the monitor.

According to the preferred embodiment of the present invention, the image quality selection pattern includes first and second sub-patterns which can be switched and displayed alternately. The plural ISO sensitivity levels are selectively displayed in the first sub-pattern, whereas the plural color reproducing conditions are selectively displayed in the second sub-pattern.

According to another embodiment of the present invention, plural names representing types of silver halide photo film are selectively displayed in the image quality selection pattern. One silver halide photo film is selected in response to the intended image intended by the user, so that the combination between the specified ISO sensitivity level and the specified color reproducing condition is determined.

According to the present invention, the image quality selection pattern and the function inputting device are provided in the digital camera, so that an image quality adjustment condition can be selected easily and simply so that the user can enjoy difference of the finish of the image with ease.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 3 is a block diagram showing an electric configuration of the digital camera;

FIG. 5 is a list showing types of photo film and features thereof.

DETAILED DESCRIPTION OF THE PREFERRED EMBODIMENTS

Figure 1:
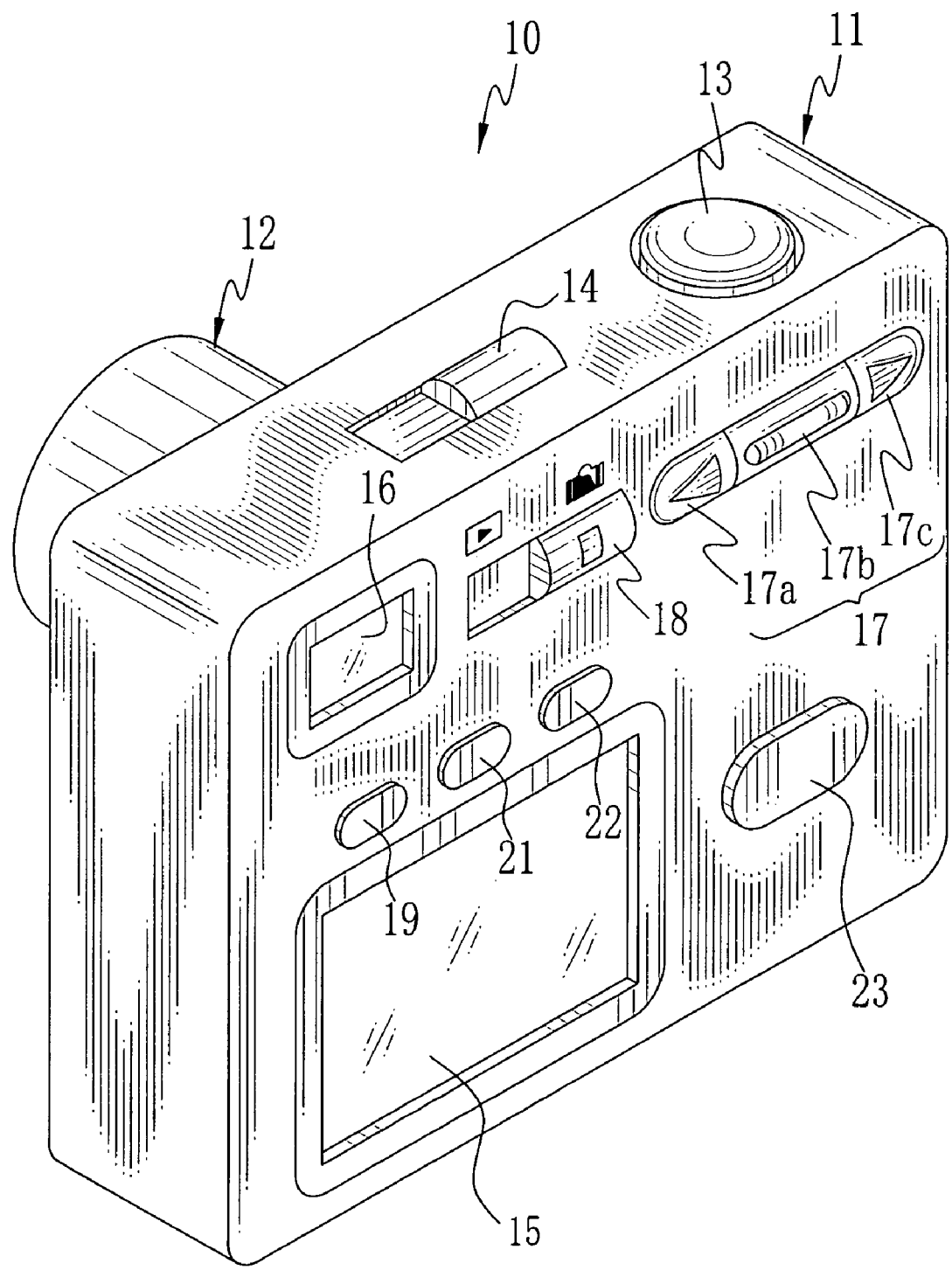
FIG. 1 is an outline perspective view of a digital still camera to which the present invention is applied.

In FIG. 1, a digital still camera 10 as digital camera is provided with a main body 11. A lens barrel 12 in which a taking lens is incorporated is provided in a front surface of the main body 11. A release button 13 and a power switch 14 are provided in an upper surface of the main body 11. An LCD panel 15 as a monitor panel, a viewfinder eyepiece window 16, general keys 17, an operating mode changeover switch 18, a menu button 19, a cancel button 21, a display button 22, and a function inputting button 23 are provided in a rear surface of the main body 11.

The operating mode changeover switch 18 switches from a photographing mode in which a photographed image is recorded in a memory card to a reproduction mode in which the photographed image is reproduced and then displayed on the LCD panel 15.

The LCD panel 15 is used to reproduce the image, and besides, it is operated as an electronic viewfinder displaying a through image for framing. In addition, the LCD panel 15 displays a setting menu for various settings.

When the menu button 19 is depressed, the setting menu is displayed on the LCD panel 15, and then the photographing mode or the reproduction mode shifts to a set-up mode. The various adjustment items are set in the setting menu. The adjustment items include items for image quality adjustment, such as an exposure value, a color reproduction, ISO sensitivity, and the number of recording pixels, and items except for the image quality adjustment, such as setting a self-timer, switching photometric method, and whether a digital zoom is used or not. The menu button 19 is also operated as a confirmation/execution button for confirming or executing the selected items and processing.

The general key 17 is operated as a cursor shift key for selecting one of the images, and moving a cursor, which is operated to select the adjustment items. The general key 17 is constituted of a left shift key 17a and a right shift key 17c for moving the cursor in a left and right direction and an up and down shift key 17b for moving the cursor in an up and down direction. The left and right shift keys 17a and 17c are pushbutton type. The up and down shift key 17b is provided in a rotatable manner in the up and down direction around an axis in a horizontal direction, and operated as a zoom button in the photographing mode. The cancel button 21 cancels the selected items and the operation. The display button 22 turns the LCD panel 15 on or off.

Figure 2A:
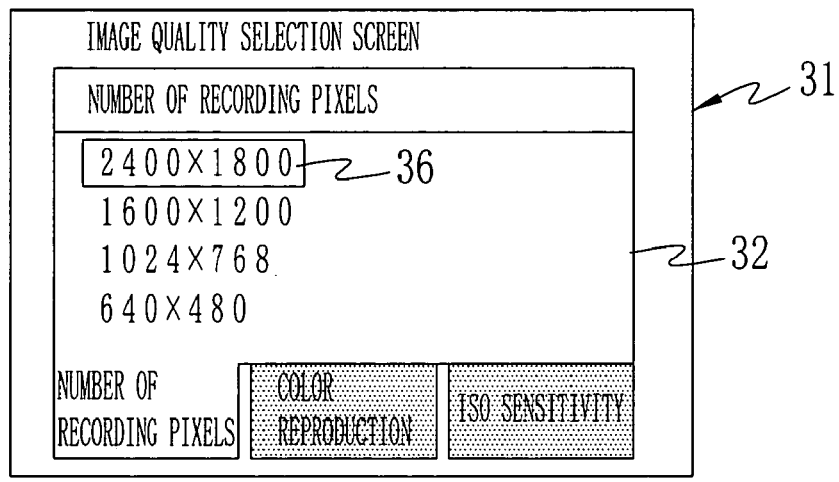
FIGS. 2A, 2B, and 2C are explanatory views of an image quality selection screen.
Figure 2B:
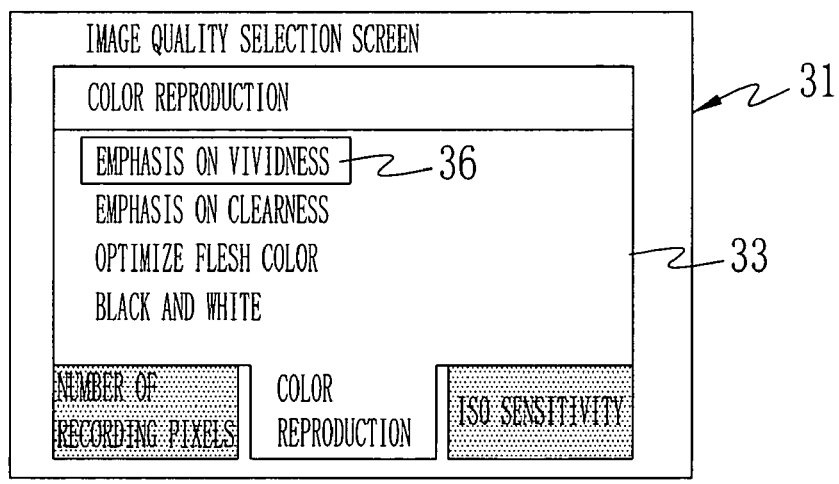
Figure 2C:
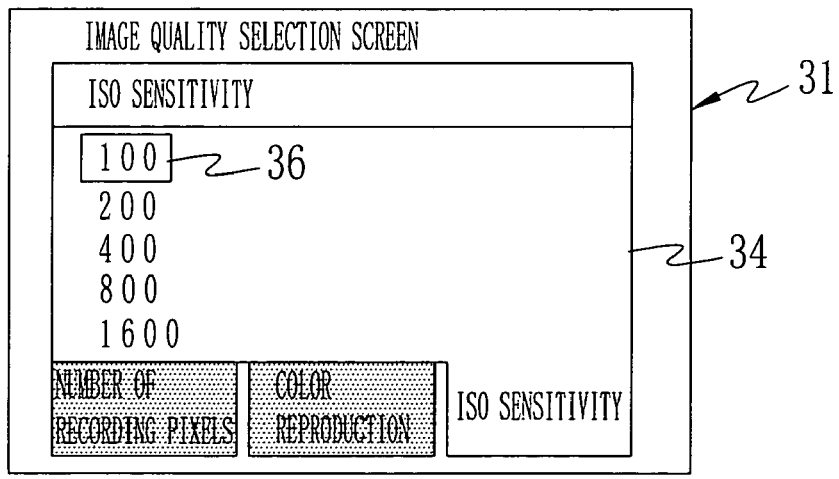

The function button 23 is operated to display an image quality selection screen 31 or selection pattern for the image quality adjustment on the LCD panel 15. As shown in FIG. 2, the image quality selection screen 31 is different from the setting menu displayed by the menu button 19, because one of the predetermined image quality adjustment conditions is selected by adjusting three image quality adjustment items: the color reproducing condition, the ISO sensitivity, and the number of recording pixels.

The image quality selection screen 31 is constituted of three sub-screens 32, 33 and 34 or sub-patterns. As shown in FIG. 2A, the sub-screen 32 is a setting menu for the number of recording pixels. As shown in FIG. 2B, the sub-screen 33 is a setting menu for the color reproducing condition. The sub-screen 34 is a setting menu for the ISO sensitivity. These sub-screens 32, 33, and 34 are displayed selectively. The tags of two sub-screens, which are not selected, are displayed in a gray-out manner. These sub-screens 32, 33, and 34 are switched by the left and right shift keys 17a and 17c.

The numbers of recording pixels, such as "2400×1800" and "1600×1200", are selectively displayed in the sub-screen 32. A cursor 36 is operated to select one of these numbers so that the number of recording pixels is set. The cursor 36 is moved by the up and down shift key 17b. Color reproducing conditions, such as "emphasis on vividness", "emphasis on clearness", and "faithful reproduction of flesh color", are selectively displayed in the sub-screen 33. The ISO sensitivity levels, such as "100", "200", "400", "800", and "1600", are selectively displayed in the sub-screen 34. These ISO sensitivity levels are selected by the cursor 36 as well as the case of the sub-screen 32. The selected contents are confirmed and set when the function button 23 is depressed again after selecting the intended items. Thereafter, the image quality selection screen 31 disappears from the LCD panel 15, and then the original menu is returned.

In case of selecting the image quality adjustment items in the image quality selection screen 31, upon the next photographing, both image pickup processing and image processing are executed in the same image quality adjustment condition as the previous condition. In the image quality selection screen 31, it is possible to set only three image quality adjustment items: the color reproducing condition, the ISO sensitivity, and the number of recording pixels, which are relatively easily understandable for the user without the expert knowledge. In addition, the image quality selection screen 31 can be displayed easily only by depressing the function button 23. Accordingly, the user can adjust the image quality easily.

In FIG. 3, a CPU 41 controls each section of the digital camera 10. A control program and various screen data or pattern data, such as a control program, the setting menu, and the image quality selection screen, are stored in a ROM 42. The CPU 41 controls each section according to the step written in the control program, based on an operation signal input from an operating section 44, such as the release button 13, the general key 17, and the function button 23. A RAM 45 is a work memory necessary for the CPU 41 to execute the control program.

An image pickup optical system constituted of a taking lens 46 and an aperture stop (not shown) is incorporated in the lens barrel 12. The taking lens 46 is driven by a lens driving mechanism, to change image pickup magnification and perform focusing. The aperture stop is driven by an aperture stop driving mechanism so that the aperture size thereof is switched. The lens driving mechanism and the aperture stop driving mechanism are controlled by the CPU 41.

A CCD image sensor 43 as an imaging device is disposed behind the image pickup optical system. As well-known, the CCD image sensor 43 is provided with a photoelectric surface in which many light-receiving elements are arranged in matrix, and photoelectrically converts the object image formed in the photoelectric surface through the image pickup optical system. In front of the photoelectric surface, there are a micro lens array for converging light to each image pixel and a color filter array in which filters for respective colors, R, G and B, are regularly arranged so as to correspond each image pixel to any of the colors.

The CCD image sensor 43 synchronizes with a vertical transfer clock and a horizontal transfer clock provided from a CCD driver 48, and thereby outputs electric charge, which has been accumulated every image pixel, as a serial image signal. Charge accumulation time (exposure time) of each image pixel is determined by an electronic shutter driving signal given by the CCD driver 48. The ISO sensitivity can be adjusted by the charge accumulation time.

An analog image signal captured from the CCD image sensor 43 is converted to digital image data by an A/D converter 47 after being amplified with the gain in response to the ISO sensitivity, and then output to an image processor 51. The image data which is input from the A/D converter 47 to an image processor 51 is CCD-RAW data in which each image data of R, G, and B is arranged in the order of reading out. The image processor 51 performs various image processing to the CCD-RAW data, such as γ-correction, white balance adjustment, and image quality correction processing including color hue correction, image size change processing, and data compression processing. A frame memory 52 is a work memory in which the image data is written when the image processor 51 applies the image processing.

The image processor 51, the frame memory 52, an LUT memory 53, a video encoder 54, and a media controller 56 are connected to the CPU 41 through a data bus 58. The CPU 41 gives a processing command to these sections through the data bus 58.

The CPU 41 gives the processing command to the CCD image sensor 43 and the image processor 51 according to the selected image quality adjustment condition. For example, when the ISO sensitivity is set to "200" in the image quality selection screen 31, the CPU 41 adjusts the level of the image signal by changing the gain of an amp corresponding to the value. In addition, when "emphasis on clearness" is selected in the color tone setting, the CPU 41 makes the image processor 51 execute a color reproducing condition processing corresponding to the adjustment condition. A plurality of color reproduction correction table data set for applying the correction processing corresponding to each color reproduction condition is stored in the LUT memory 53. The image processor 51 selects the color reproduction correction table data set according to the selected color reproducing condition, to execute the image quality correction processing. Furthermore, the image processor 51 applies a resize processing to the image data, which has been captured in response to the selected number of the recording pixels, and records the processed image data in the memory card 57.

The video encoder 54 converts the image data of the through image captured by the CCD image sensor 43 and screen data or pattern data in the ROM 42 to a composite signal, and then sends the composite signal to the LCD panel 15, to display the through image and the selection screen. The media controller 56 writes/reads an image file in accessing the memory card 57. The image data of which image has been processed is recorded in the memory card 57 in the photographing mode; meanwhile, the image data is read out from the memory card 57 in the reproduction mode.

Next, the operation of the above embodiment is explained. When the function button 23 is depressed, the image quality selection screen 31 is displayed on the LCD panel 15. The user can select the intended image quality by adjusting the three items: the color reproducing condition, the ISO sensitivity, and the number of recording pixels in the image quality selection screen 31. The user operates the general keys 17 to move the cursor, and thereby selects the image quality. Both the color reproducing condition and the ISO sensitivity are well known as the selection criteria of the photo film in the prior art photographic film camera, so that the user can select these items as if to select the photo film. The meaning of the number of recording pixels is also widely known along with the rapid spread of the digital camera, so that the user can select the number of recording pixels without being confused.

The photographing mode is set after selection of the image quality adjustment condition. A through image is started to be captured, and then the subject image is displayed on the LCD panel 15 in real time. The user depresses the release button 13 after framing during watching the through image.

The CCD image sensor 43 converts the subject image to an electric signal within the charge accumulation time corresponding to the brightness of the subject. The electric signal is sent to the image processor 51 after amplified with the gain in response to the ISO sensitivity, to be processed according to the selected color reproducing condition. After that, the image data is written in the memory card 57 during thinning out the pixels in response to the number of recording pixels.

Figure 4:
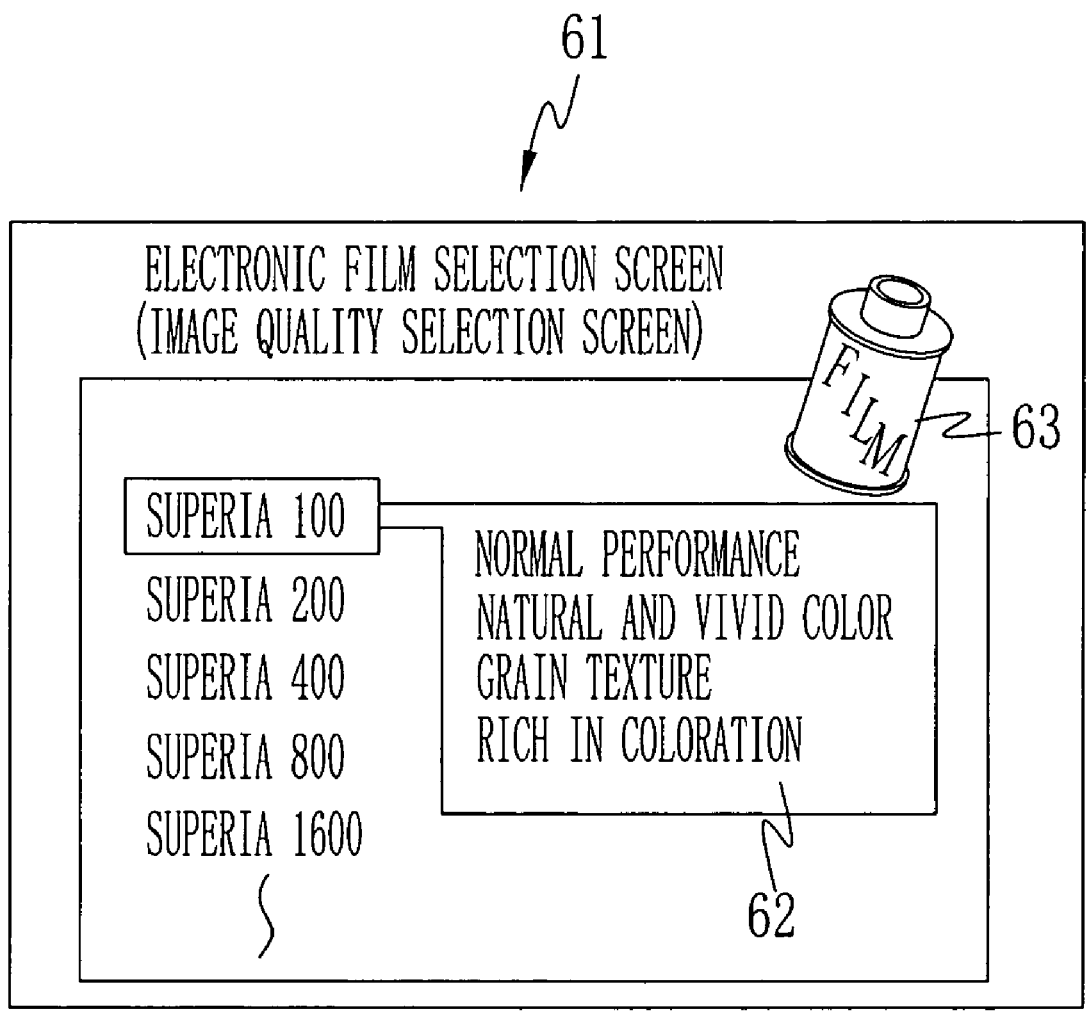
FIG. 4 is an explanatory view showing another example of an image quality selection screen.

According to the above embodiment, although the ISO sensitivity, the color reproducing condition, and the number of recording pixels can be selected in the image quality selection screen, only the ISO sensitivity and the color reproducing condition may be selected. The plural types of image quality adjustment conditions, in which the combinations between the ISO sensitivity and the color reproducing condition are different, are displayed in an image quality selection screen 61 or selection pattern shown in FIG. 4. The names to remind the user of the photo film are used as the name of each image quality adjustment mode; for example, "SUPERIA 100 (commodity name)" and "SUPERIA 200 (commodity name)".

As above-mentioned, since the ISO sensitivity and the color reproducing condition are already known as the selection criteria of the photo film, the names to remind the user of the photo film is used as the name of the image quality adjustment condition, so that the user, who has been used the photographic film camera, can easily understand the meaning of the image quality selection screen 61. Furthermore, it is preferable that a balloon frame 62 or indicia surrounding the letter string or words is displayed in the image quality selection screen 61 when each image quality adjustment condition is selected, and then description of each feature of the image quality adjustment conditions is displayed in the balloon frame 62. FIG. 5 illustrates examples of the description. Additionally, the name of the image quality selection screen 61 itself is "electronic film selection screen", or a photo film cassette image 63 is inserted in the screen, so that the user can understand easily to select the photo film.

According to the above embodiment, a digital still camera for recording a still picture is applied to the present invention; however, a video camera for recording a moving picture may be applied thereto.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera in which ISO sensitivity of an image sensor and a color reproduction of a photographed image are adjustable, said photographed image being reproduced in a monitor, said digital camera comprising:

a memory for storing an image quality selection pattern adapted to designate only plural ISO sensitivity levels of said ISO sensitivity and plural color reproducing conditions of said color reproduction;

a function inputting device for selecting said image quality selection pattern from said memory to display said image quality selection pattern on said monitor; and a designation device for designating one of said plural ISO sensitivity levels and one of said plural color reproducing conditions on said image quality selection pattern which is displayed on said monitor;

wherein plural names representing each type of silver halide photo film are displayed in said image quality selection pattern and usable selectively, and combination between the specified TSO sensitivity level and the specified color reproduction condition is designated by each of said names;

wherein each of said names is a product name of said silver halide photo film and includes a portion representing said ISO sensitivity level; and wherein film property including said specified color reproducing condition is displayed in a balloon indicia when one of said plural names is selected.

2. A digital camera as claimed in claim 1, wherein said image quality selection pattern is constituted by a first sub-pattern and a second sub-pattern predetermined and indicated alternately, said plural ISO sensitivity levels are displayed in said first sub-pattern and usable selectively, and said plural color reproduction copditions are displayed in said second sub-pattern and usable selectively.

3. A digital camera as claimed in claim 2, wherein said image quality selection pattern further comprises a third sub-pattern, a plurality of the number of recording pixels is displayed in said third sub-pattern and usable selectively.

* * * * *